United States Patent
Casals Guillen et al.

(10) Patent No.: US 12,181,410 B2
(45) Date of Patent: Dec. 31, 2024

(54) SENSING ARRANGEMENT AND CORRESPONDING DETECTOR DEVICE

(71) Applicants: UNIVERSITAT DE BARCELONA, Barcelona (ES); TECHNISCHE UNIVERSITÄT BRAUNSCHWEIG, Braunschweig (DE)

(72) Inventors: Olga Casals Guillen, Barcelona (ES); Nicolai Markiewicz, Lengede/Broistedt (DE); Cristian Fàbrega Gallego, Barcelona (ES); Andreas Hans Wilhelm Waag, Würzburg (DE); Juan Daniel Prades García, Barcelona (ES)

(73) Assignees: UNIVERSITAT DE BARCELONA, Barcelona (ES); TECHNISCHE UNIVERSITAT BRAUNSCHWEIG, Braunschweig (DE)

( * ) Notice: Subject to any disclaimer, the term of this patent is extended or adjusted under 35 U.S.C. 154(b) by 336 days.

(21) Appl. No.: 17/798,432

(22) PCT Filed: Feb. 11, 2021

(86) PCT No.: PCT/EP2021/053268
§ 371 (c)(1),
(2) Date: Aug. 9, 2022

(87) PCT Pub. No.: WO2021/160707
PCT Pub. Date: Aug. 19, 2021

(65) Prior Publication Data
US 2023/0076676 A1 Mar. 9, 2023

(30) Foreign Application Priority Data
Feb. 12, 2020 (EP) .................................... 20382093

(51) Int. Cl.
*G01N 21/64* (2006.01)
*G01N 21/31* (2006.01)

(52) U.S. Cl.
CPC ......... *G01N 21/6428* (2013.01); *G01N 21/31* (2013.01); *G01N 2201/062* (2013.01)

(58) Field of Classification Search
CPC .............. G01N 21/6428; G01N 21/31; G01N 2201/062; G01N 2021/7783; G01N 2021/7786; G01N 21/645; G01N 21/78
See application file for complete search history.

(56) References Cited

U.S. PATENT DOCUMENTS 9,643,181 B1  5/2017  Chang et al.
2005/0063870 A1*  3/2005  Fukushima .......... G01N 21/553
                                                  356/432

(Continued)

OTHER PUBLICATIONS

International Search Report from corresponding International Application No. PCT/EP2021/053268 mailed on Mar. 30, 2021, 3 pages.

(Continued)

*Primary Examiner* — Courtney D Thomas
(74) *Attorney, Agent, or Firm* — Tucker Ellis LLP

(57) ABSTRACT

A sensing arrangement and corresponding detector device includes
a sensing area, for accommodating a sensing substance selected for experimenting an optical response as a response of an external stimulus;
a light emitter, for emitting light towards said sensing area;
a light receiver, for receiving a light from said sensing area;
a substrate having a first substrate surface and a second substrate surface;
wherein, said light emitter includes a first LED and the light receiver includes a second LED, both LEDs formed on the (Continued)

first substrate surface; and the sensing arrangement further includes a trench, formed between the first LED and the second LED.

19 Claims, 6 Drawing Sheets

(56) References Cited

U.S. PATENT DOCUMENTS

| | | |
|---|---|---|
| 2018/0275340 A1 | 9/2018 | Wang et al. |
| 2018/0347797 A1 | 12/2018 | Nicholas et al. |
| 2019/0049367 A1 | 2/2019 | Zou |
| 2021/0399030 A1* | 12/2021 | Li ..................... H01L 27/1464 |

OTHER PUBLICATIONS

Ji, L.W., et al., "Nitride-based light-emitter and photodiode dual function devices with InGaN/GaN multiple quantum dot structures", Journal of Crystal Growth, Elsevier, Amsterdam, May 2008, vol. 310, No. 10, pp. 2476-2479.

Li, K.H. et al., "Chip-scale GaN integration", Progress in Quantum Electronics, Pergamon Press, Oxford, Feb. 2020, vol. 70.

* cited by examiner

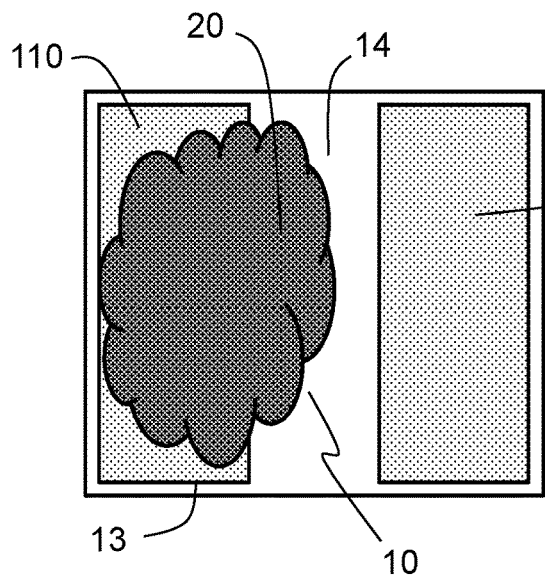
FIG. 9bis
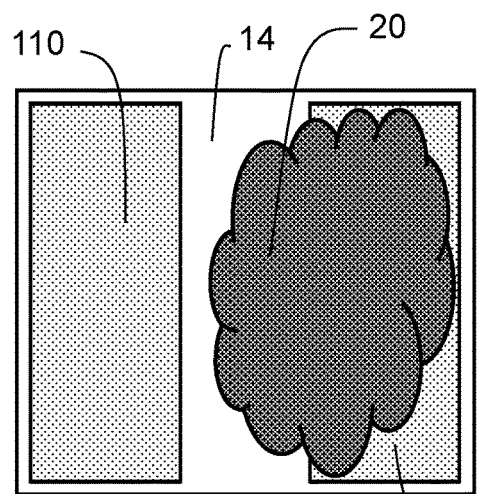
FIG. 10bis
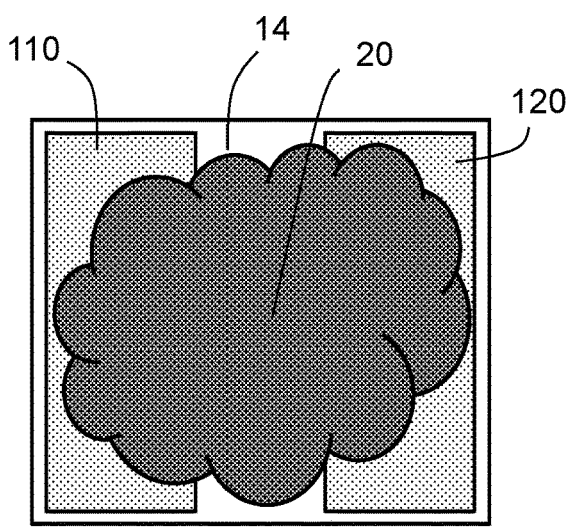
FIG. 11bis
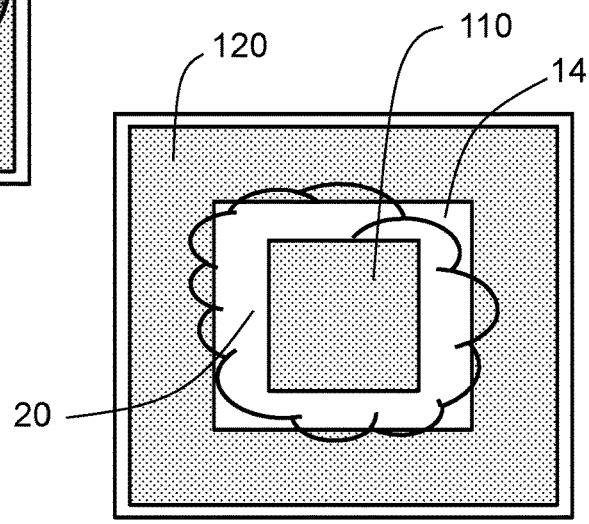
FIG. 12bis

SENSING ARRANGEMENT AND CORRESPONDING DETECTOR DEVICE

RELATED APPLICATION DATA

This application is a national phase application of International Application No. PCT/EP2021/053268 filed Feb. 11, 2021. The entirety of the aforementioned application is incorporated herein by reference.

FIELD OF THE INVENTION

The invention lies in the field of sensors that rely on a substance, sometimes called dye, that responds to external stimuli with changes that can be measured optically. The external stimuli can be of varied nature, for example, physical changes like variations of temperature, presence of chemical or biological materials, irradiations that generate a fluorescence response in the substance, etc. The devices are configured to measure those optical responses and can thus be used for temperature control, chemicals detection, or the like.

The invention also relates to a detector device using the sensing arrangement.

This project has received funding from the European Union's Horizon 2020 research and innovation programme under grant agreement No 952135.

BACKGROUND ART

In order to grant a correct measure of the optical response of the sensing substance it is necessary that the light emitter provides an excitation light to the sensing substance that is adequate and well known. It is also necessary that the light receiver acquires the resulting light, coming after the interaction with the sensing substance.

Therefore, the resulting accuracy of the device is extremely sensitive to the alignments and the operation conditions of the elements (e.g. stable light emission, stable sensitivity at the detector, etc.). In particular it is sensitive to the optical path between the light emitter and the light receiver, for example, to misalignments between components and with the sensing substance. Indeed, light deviations can occur along the optical path between the light emitter and receiver. These are fractions of the emitted light that do not interact with the sensing substance or with the light receiver and are thus not useful to generate a readout signal. Moreover, they can lead to inaccurate or false readouts.

Some known solutions make use of macroscopic scale apparatus. In these devices, the sensing substance is usually in a removable cartridge or another container that is inserted in the apparatus for measurement. Consequently, these apparatuses are bulky and often expensive, having complex manufacturing processes. Even in these cases, the light emitter and detector need to be perfectly aligned to provide accurate information.

There have also been attempts to integrate such solutions in smaller form factors, combining LEDs and photodetectors in one single miniaturized system. In general, the manufacturing process comprises welding the individual components (LED, photodetector, etc.) on a printed circuit board or, in some cases, bonding them at a chip scale. The resulting devices are smaller than the previous cases, but they show similar problems regarding the accuracy of their alignment and the complexity of its manufacturing process, due to the fact that they require the combination of devices produced in different microelectronic processes.

Therefore, a new type of device is needed that minimizes the possibility of misalignments and, at the same time, results in a small device which is also simple to manufacture, thereby minimizing cost and improving reliability.

Another objective of the invention is to grant a high sensitivity. In the aforementioned detectors sensitivity has been generally boosted by increasing the intensity of the emitted light, thereby increasing the signal to noise ration of the received light. The main drawback of this approach is that it further increases the power consumption.

SUMMARY OF INVENTION

The invention is aimed to provide a sensing arrangement of the type stated at the beginning, being able to avoid the problems that have been identified above.

This purpose is achieved by the provision of a sensing arrangement comprising:
  a sensing area, configured for accommodating a sensing substance selected for experimenting an optical response as a response of an external stimulus;
  a light emitter, configured for emitting a first light towards the sensing area; and
  a light receiver, configured for receiving a second light from the sensing area; and
  a substrate having a first substrate surface and a second substrate surface, opposite the first substrate surface;
wherein,
  the light emitter comprises a first LED, formed on the first substrate surface;
  the light receiver comprises a second LED, formed on the first substrate surface; and
  the sensing arrangement further comprises a trench, formed between the first LED and the second LED.

Therefore, the sensing substance to be arranged in the sensing area is of the kind that responds to an external stimulus with changes that can be measured optically. The external stimulus can be of varied nature, for example, physical changes like variations of temperature, presence of chemical or biological materials, irradiations that generate a fluorescence response in the substance, etc. The devices are configured to measure those optical responses and can thus be used for temperature control, chemicals detection, or the like.

Preferably, the external stimulus is at least one of:
  a presence of a chemical substance,
  a physical change, in particular of temperature, electromagnetic field, electro-magnetic radiation;
  a presence of a biological entity, in particular cells, microorganisms or other biological material;
or combinations thereof.

In a conventional LED structure, light is generated at the interface between two semiconductor regions of complementary doping (p-type and n-type regions). In order to maximize the light generation efficiency, and to tune the emission wavelength, complex stacks of semiconductor materials are grown in this interface, including different doping levels and layers made of other semiconductor alloys with different bandgap energies. These structures are known as MQW (Multi Quantum Wells). Light is emitted in the MQW structure, and after a certain internal absorption, most of the power generated there manages to leave the semiconductor, either through the p or n regions or through the edges of the MQW. This later fraction of light will be named here as $P_{mqw}$.

Once excluded $P_{mqw}$, the fraction of the light that emerges from the LED is the combined result of photons leaving the semiconductor after a certain number of internal reflections. That fraction will be named here as $P_{surf}$. Such reflections make this light sensitive to the semiconductor surface properties and can leave the device in any direction; even through the substrate, if it is transparent. From a practical perspective, the maximum intensity of $P_{surf}$ is obtained in the direction perpendicular to the LED surface, and decays continuously until reaching a zero-emission in a direction parallel to the surface.

The MQW acts as a waveguide for light, favoring its propagation across this layer. Consequently, the fraction of light emitted parallel to the MQW and from its edges is particularly intense ($P_{mqw}$).

In summary, there is light coming out of an LED device, a fraction being emitted mostly perpendicular to the LED surface, and another important fraction being emitted from the edges of the device, emerging from the MQW borders. Still, light is being emitted in all directions.

Even if the LEDs are designed initially to operate as light emitters, they can also be used as photodiodes. LED capabilities for detecting light are not as well optimized as pure photodiodes aimed for that functionality, for this reason its usage as light detectors is discouraged in the art. Nevertheless, it has been found that the semiconductor structure that enables the LED light emission functionality can also be used as a light detector in the same light energy range. In this case, both the voltage and current signals generated at the detector can be used as control magnitudes without any additional component to transform them. Therefore, it is possible to fabricate a LED emitter accompanied by a LED detector on the same manufacturing process, in particular using one single semiconductor growth process.

In the sensing arrangement of the invention, both the light emitter and the light receiver are LEDs formed on the same substrate, preferably, formed from one single semiconductor stack and thus having the same structure, for example, in terms of their n, p and MQW layers. The trench between the first LED and the second LED is preferably configured to intersect the MQW of the first LED, thereby avoiding that the light generated by the first LED propagates directly to the second LED through that MQW. Another advantageous effect of the trench is isolating the p-n junctions of each LED, so that both LEDs do not form a single LED entity. In a preferred embodiment, the trench cuts across the p-n junction, preferably the trench cuts across the MQW, thus maximizing the interference with the light that propagates from the first LED. In other alternative embodiments, the trench cuts across all the LED layers, reaching the substrate, thus maximizing the volume inside the trench.

The skilled person will understand that other equivalent solutions can be followed instead of actually performing a semiconductor growth of the LEDs over the substrate: for example, it is possible to grow the LEDs over an initial substrate and then transfer them to the substrate of the sensing arrangement. Therefore, the term "formed" in the description above does not necessarily implies that the LED has been actually grown over the substrate.

This construction has the effect that it can be easily and accurately manufactured using standard lithography methods, thus minimizing the complexity and greatly reducing the cost. Moreover, the alignment can be very precise. Consequently, the resulting device is able to provide accurate measurements and the light deviations due to misalignment are minimized. Deviations of the light associated with misalignment result in a waste of energy that is not detected by the light receiver. Increasing the output power has been used as a workaround in some cases, the current invention does not need such increased output power and is more efficient in terms of energy consumption. Moreover, the problems caused by misalignments cannot always be solved by increasing the output power, therefore, the sensing arrangement of the invention grants an improved performance and sensitivity.

Preferably, the optical response is at least one of:
a color change;
a transparency change;
a change in absorbance in at least one electromagnetic spectral band;
a fluorescent response;
or combinations thereof.

Optical changes related to the color, transparency or spectral absorbance are particularly well suited for being used in sensors having a light emitter and a light receiver. In the case of the invention, this is achieved by selecting the appropriate LED compositions that emit/receive light in the spectral areas of interest. Depending on the kind of sensing substance and its optical response, it could be necessary to measure the light that has passed through the substance, the light that has been reflected by the substance or a combination thereof. Some non-limiting examples of substances having optical changes are discussed hereinafter. Several colorimetric sensors monitor color or absorbance changes produced by a chemical reaction such as the Berthelot reaction or the Nessler's method for ammonia and the Saltzman method for $NO_2$. Ph indicators (such as bromophenol blue, Phenol red, m-Cresol purple, Thymol blue, α-naphtholphthalein, etc.) are used in colorimetric sensors not only for pH determination but also for monitoring ammonia and/or $CO_2$ in the environment or in water when they are trapped or immobilized in a polymeric matrix. In the similar polymeric matrix, rhodium complexes are immobilized for CO detection, whereas porphyrin-based molecules are able to monitor small concentrations of $NO_2$ or volatile organic compounds. Thermochromic liquid crystals (TLCs) react to changes in temperature in the range from −30° C. to around 115° C. by changing color. Depending of the composition of the TLCs they change reversibly or irreversibly from a certain color to transparent or from transparent to a certain color at a determinate temperature point, which can be tunable by changing the composition of the material or of a mixture of materials.

In the case of a fluorescent response, the sensing substance is irradiated with the light coming from the light emitter that leads to a photo excited state of the electron structure of the fluorescence substance, that in turn generates a subsequent radiative emission of fluorescent light as the electron structure returns to ground or stable state. The fluorescent light is then received by the light receiver. The fluorescence process can be influenced by the presence of external stimuli in a way that fluorescence effect can be, for example, intensified, diminished, accelerated or delayed. Therefore, by analyzing the readout of the light receiver it is possible to infer the presence of the external stimulus, in the examples, by analyzing the intensity of the fluorescence light or the time it takes to be received after the initial emission of light. As non-limiting examples, changes in the fluorescent properties of some molecules due to the presence of certain substances can be used to monitor the concentration of these substances in gaseous or liquid environments such as in the case of changes in the fluorescence emission of bromophenol blue due to the presence of ammonia or in fluorescence emission of tetraphenylporphyrin (TPP) due to $CO_2$. At the same time single molecules, intact organelles, live cells, whole organisms and molecular or cellular processes can be monitored by means of fluorescent biomarkers.

Preferably, the substrate is transparent and the sensing area is provided on the second substrate surface. Therefore, the sensing substance can be provided in the surface opposite to the surface where the LEDs are formed: the light emitted from the first LED is directed to the sensing area through the different layers and the substrate, and the received light follows the respective light path or paths from the sensing area to the second LED. The second substrate surface is typically a more robust and larger surface that the one where the LEDs are formed. Consequently, it can be easily manipulated and the available space for accommodating the sensing substance is large. This is particularly advantageous in the cases where the sensing substance has to be replaced, for example, when its sensing properties degrade over time. Therefore, this preferred embodiment simplifies reusing the monolithic sensing arrangement by refreshing or replacing the sensing substance when needed.

Preferably, the trench contains a light blocking layer, configured to block a direct light from the first LED to the second LED, thus minimizing the direct light emitted from the first LED to be received directly by the second LED, without interaction with the sensing substance, thereby minimizing possible interferences and false readouts.

Preferably, the sensing arrangement further comprises a microfluidic channel arranged in the sensing area and configured to contain the sensing substance, thus being particularly advantageous in the cases where the sensing substance has to be in a liquid form.

In an alternative embodiment, the sensing area is provided in the trench. This way, the sensing substance can be accommodated within the part of the sensing arrangement that receives more light from the light emitter, thus maximizing the efficiency of irradiation to the sensing substance. Besides, the $P_{mqw}$ part of the emitted light from the first LED is directed in a straight optical path towards the second LED, through the sensing area. The skilled person will understand that, when the sensing substance is present in the sensing area, refraction effects may occur and a portion of the $P_{mqw}$ part of the light emitted from the first LED might not reach the second LED following a straight optical path. Nevertheless, it is to be expected that most of the $P_{mqw}$ part reaches the second LED passing through the sensing substance. Therefore, not only the substance is irradiated with more efficiency but also the received light by the second LED is maximized. The latter is not necessarily true in the case of fluorescence effect since the received light is not directly the emitted light. The resulting embodiment is particularly advantageous for maximizing the efficiency of the arrangement, thus being able to decrease the power consumption and/or increase the signal to noise ratio, thereby increasing the sensitivity.

Preferably, the sensing arrangement further comprises a microfluidic channel arranged in the sensing area and configured to contain the sensing substance, thus being particularly advantageous in the cases where the sensing substance has to be in a liquid form.

Preferably, the microfluidic channel is formed by a cap arranged covering the trench. This way, the trench forms the floor and the vertical walls of the microfluidic array while the cap forms the top of the microfluidic channel. Therefore, these embodiments take advantage of the geometry of the sensing arrangement and use the trench itself to form the microfluidic channel by adding a cap covering the trench, thus minimizing the complexity of the device and also maximizing the internal volume of the microfluidic channel.

Preferably, the substrate is reflective when viewing from the first substrate surface, thus facilitating that the light is forced to travel towards the sensing substance, in particular for the cases where the sensing area is not located in the second substrate surface. Indeed, the part of the emitted light that travels towards the substrate is reflected, so it does not escape the device through the substrate. This embodiment is particularly simple to manufacture by coating the standard transparent substrates used in LED technology (e.g. sapphire) with a reflective finishing, or by transferring the LED stack to a reflective, non-transparent carrier wafer (e.g. silicon) that will then become the substrate of the sensing arrangement.

In an alternative embodiment, the substrate is transparent and the sensing arrangement further comprises a reflective coating provided covering at least part of the substrate, wherein reflection is produced towards the substrate, thus coating the external surfaces of the substrate that are not in contact with the LEDs. This is an alternative solution having the same technical effect that the aforementioned embodiment: instead of having a substrate that is itself reflective, the sensing arrangement is provided with a coating.

Preferably, the sensing arrangement further comprises a reflective coating arranged covering at least the part of the external surface of the first LED that is not facing the sensing area, wherein reflection is produced towards the first LED, thus reflecting the emitted light from the first LED and avoiding that it leaves the device in a direction that would not be reaching the sensing substance. This diminishes the amount of light that is wasted and therefore increases efficiency and/or sensitivity. The combination of the aforementioned options of a reflective substrate together with a reflective coating over the first LED is particularly advantageous in terms of efficiency and/or sensitivity since it allows that most of the light emitted by the first LED is directed towards the sensing area, thereby optimizing the efficiency.

Preferably, the first LED is arranged parallel to the second LED. Therefore, the trench is also parallel to both first LED and second LED and the overall layout is simplified, resulting in a sensing arrangement having a low manufacturing cost.

Preferably, the second LED is arranged concentric with the first LED. Therefore, the trench is also concentric to the first LED. This layout is particularly advantageous in the cases where the sensing area is located in the trench, since most of the light emitted by the first LED is directed towards the trench and then the second LED, thereby increasing efficiency and/or sensitivity.

Preferably, the light receiver further comprises at least one further LED, formed on the first substrate surface and configured for receiving a further light from the sensing area. In this case the light coming from the sensing substance can be received by a plurality of second LEDs, increasing the flexibility in the location and arrangement of the sensing area. In some cases, this layout also makes possible a readout measure even in cases where part of the light is blocked or if any of the second LEDs is defective. A further advantageous use of this option is in the case where there is a need for a calibration of the measure. This calibration is common, for example, when using some sensing substances that respond with a change of color. In those cases, the sensing substance can be arranged interfering the optical path between the light emitter and one of the second LED and the further LED, while the optical path between the light emitter and the other of the second LED and the further LED is kept clean of sensing substance. Therefore, one of the LEDs of the light receiver can measure the direct light from the light emitter and use it for calibration, while the other LED of the light receiver is used for the measure through the sensing substance.

In an advantageous embodiment, said first LED and said second LED are dual emitters and receivers, so that the second LED is further configured for emitting light towards said sensing area and said first LED is further configured for receiving light from said sensing area. As it has been discussed above, LEDs can act as emitters or receivers, this preferred embodiment thus allows a dual functionality for each LED. This has the further advantage that the measures of the corresponding detector can be done in both directions of this dual functioning, which can be also used for verification purposes of the measures. The same dual feature can also be envisaged in the case of the at least one further LED.

Preferably, the sensing area is provided with a textured surface. As a general rule, it is preferably that the sensing substance is as thick as possible, since it will benefit the interaction between the sensing substance and the light beam traveling from the emitter. This is the case, for example, of color indicators sensitive to physical magnitudes like temperature, electromagnetic fields, or the like. In these cases, a change affects all the volume of the sensing substance at once, changing its color globally. The skilled person will understand that it is also preferable that the distance between the emitter and receiver should be kept as small as possible for the sake of efficiency and manufacturing costs, so a balance must be found. In contrast, in some cases like the reaction to chemical and biological stimuli, it is preferable that the surface of the sensing substance that is exposed is as large as possible. Therefore, providing a sensing area with a textured surface potentially increases the surface-to-volume ratio in cases where the sensing substance has the form of a thin layer, thereby increasing the sensitivity for applications based on the reaction to chemical stimuli.

Preferably, the textured surface is in the form of ridges. The ridges can be created by the etching steps of the lithography process. Therefore, they are easy to manufacture and do not notably increase the cost of the device.

The invention also refers to a detector device comprising a sensing arrangement according to any of the embodiments disclosed above and a sensing substance arranged in the sensing area of the sensing arrangement, wherein the sensing substance is selected for experimenting an optical response as a response of an external stimulus, thus obtaining a device that can be used as a sensor based on the responses of the sensing substance to the external stimulus, and with the advantages disclosed above.

Preferably, the sensing substance is further arranged over at least part of the surface of at least one of the first LED and the second LED. Preferably, the sensing substance is further arranged over at least part of the surface of at least one of the at least one further LED. In particular in the cases where the sensing area is inside the trench, the sensing substance must be arranged in the sensing area in order to receive the light from the light emitter and that the light receiver receives the light from the sensing substance.

Nevertheless, granting a high precision in positioning the substance during the manufacturing process is not always possible without increasing manufacturing costs. Therefore, having the sensing substance further extending to parts of the first or the second LEDs is advantageous to grant that at least part of the substance is located where needed without increasing the manufacturing cost.

Preferably, the sensing substance is arranged as a film layer, being a particularly advantageous option in the case, for example, of sensing substances that respond to chemical or biological stimuli.

In an alternative embodiment, the sensing substance is arranged filling the trench, being a particularly advantageous option in the case, for example, of sensing substances that respond to some physical stimuli like temperature changes.

In another preferred embodiment, the sensing substance is arranged inside a microfluidic channel, being a particularly advantageous option for cases where the sensing substance has to be in liquid form.

The invention also refers to a multi-detector device comprising a plurality of detector devices according to any of aforementioned embodiments, wherein the substrate is common for all the detector devices. This device has the advantage that it can be manufactured in a single wafer, with a reduced production cost and still maintaining the high level of accuracy in optical alignment discussed above. Moreover, each of the plurality of the detector devices can have, independently, its particular sensing substance. Therefore, it is possible to obtain a multi-detector device that allows simultaneous measures of a plurality of stimuli. In some preferred embodiments, a single light emitter is shared for different sensing areas and different light receivers, thus optimizing the consumption power of the multi-detector device.

The invention also includes other detail features illustrated in the detailed description of some embodiments of the invention and in the accompanying figures.

BRIEF DESCRIPTION OF DRAWINGS

Further advantages and features of the invention will become apparent from the following description, in which, without any limiting character, preferred embodiments of the invention are disclosed, in reference to the accompanying figures:

FIGS. 9*bis* to 12*bis* correspond to FIGS. 9 to 12, including a graphical correction in the transparency layer of the previous figures in order to clarify its elements.

DESCRIPTION OF EMBODIMENTS

Figure 1:
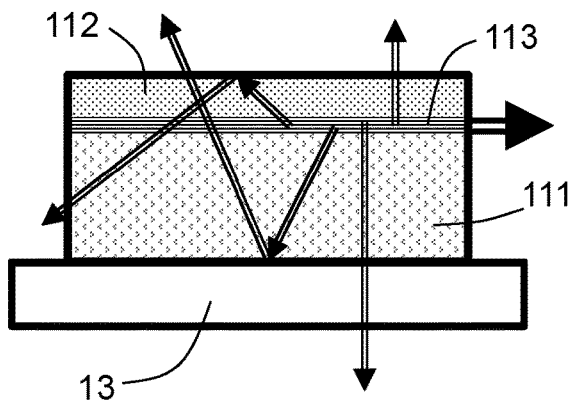
FIG. 1 represents some of the internal reflections and light emission angles of one LED structure.
Figure 2:
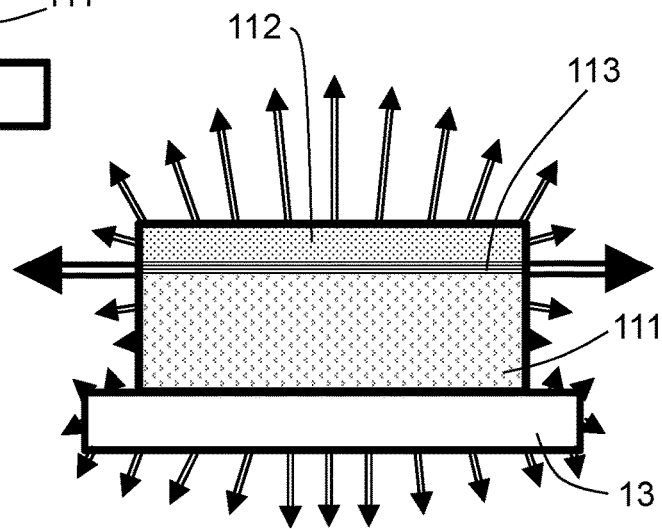
FIG. 2 represents the emission of light from one LED structure formed over a transparent substrate.
Figure 3:
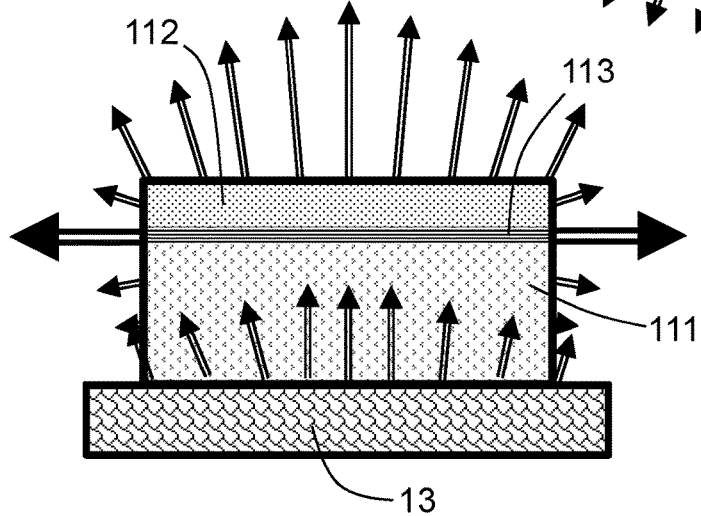
FIG. 3 represents the emission of light from one LED structure formed over a reflective substrate.
Figure 4:
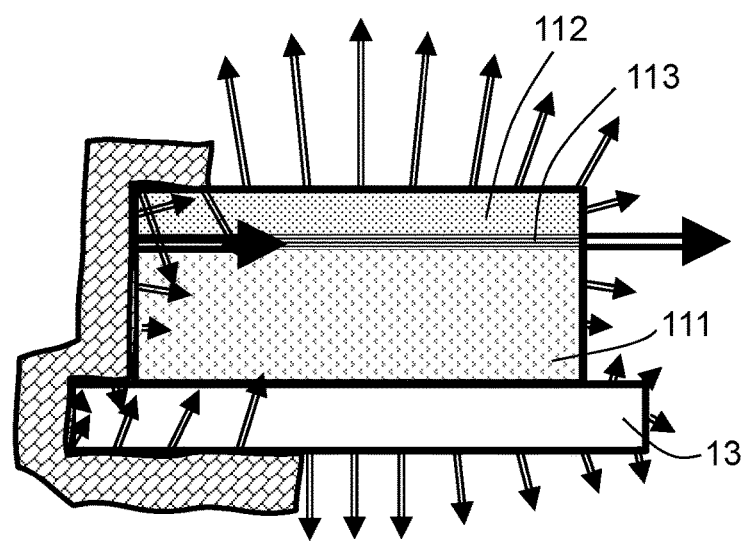
FIG. 4 represents some of the internal reflections and light emission angles of one LED structure formed over a transparent substrate and having a partial coating.

FIG. 1 to FIG. 4 represent the light emission from a LED. In particular, FIG. 1 shows several examples of internal reflections of light that is generated by the LED, as well as part of the emitted light that leaves the LED, having a particular strong emission from the MQW structure 113. Light rays are represented by arrows. FIG. 2 is aimed to show that a LED in general emits in all directions, even if most of the light is emitted from the MQW. The example of FIG. 2 has a transparent substrate 13, while in FIG. 3 the substrate is reflective. Therefore, in the case of FIG. 3 the light cannot leave the LED through the substrate 13 because it is reflected thereof. The example of FIG. 4 shows a case where the LED is partially covered with a reflective coating, in this case arranged in the left end of the LED. The coating reflects the light and, thus, the part of the light that leaves the LED through the other end is maximized. The skilled person will understand that, in cases where the reflective coating is made of an electrical conductor, appropriate insulating layers may be arranged between the coating and the LEDs or the substrate in order to avoid unwanted currents or short circuits. These examples are aimed to clarify the internal reflections and light emissions that can occur in several of the embodiments that will be described hereinafter.

Figure 5:
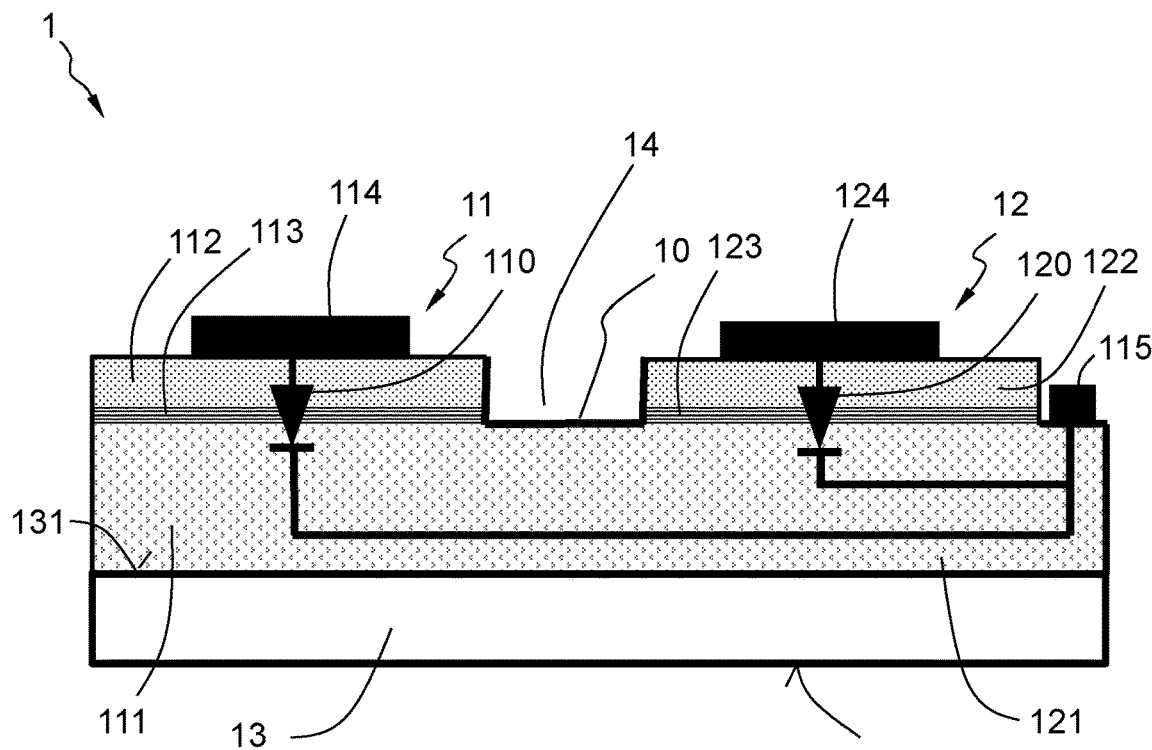
FIG. 5 is a simplified sectional view of a sensing arrangement according to one exemplary embodiment.

FIG. 5 shows one exemplary embodiment of the sensing arrangement 1 according to the invention. The figure is a representation of a sectional view of the sensing arrangement 1. The equivalent circuit elements are also represented in the form of the electrical symbols of diodes and connections. This equivalent circuit elements are shown only for clarification purposes.

In particular, the sensing arrangement 1 of FIG. 5, comprises:
   a sensing area 10, configured for accommodating a sensing substance 20 selected for experimenting an optical response as a response of an external stimulus;
   a light emitter 11, configured for emitting a first light towards the sensing area 10; and
   a light receiver 12, configured for receiving a second light from the sensing area 10.

The sensing arrangement 1 further comprises a substrate 13 having a first substrate surface 131 and a second substrate surface 132, opposite the first substrate surface 131. The light emitter 11 comprises a first LED 110, formed on the first substrate surface 131, and the light receiver 12 comprises a second LED 120, formed on the first substrate surface 131. The figure shows the corresponding circuit elements in the form of diode symbols. In this particular example both LEDs 110, 120 are formed on the substrate 13 and have a n-type layer 111, 121, and a p-type layer 112, 122. Formed between the two layers there is an MQW 113, 123 structure. Each LED 110, 120 is connected to an electrical terminal 114, 124 in the p-type layer and, in the case of the example, both are connected to a common terminal 115 in the n-type layer since the n-type layer is common for both LEDs in this example. Other examples have a different terminal for each LED. For the sake of clarity, the figure does not show the electrical connections.

Figure 6:
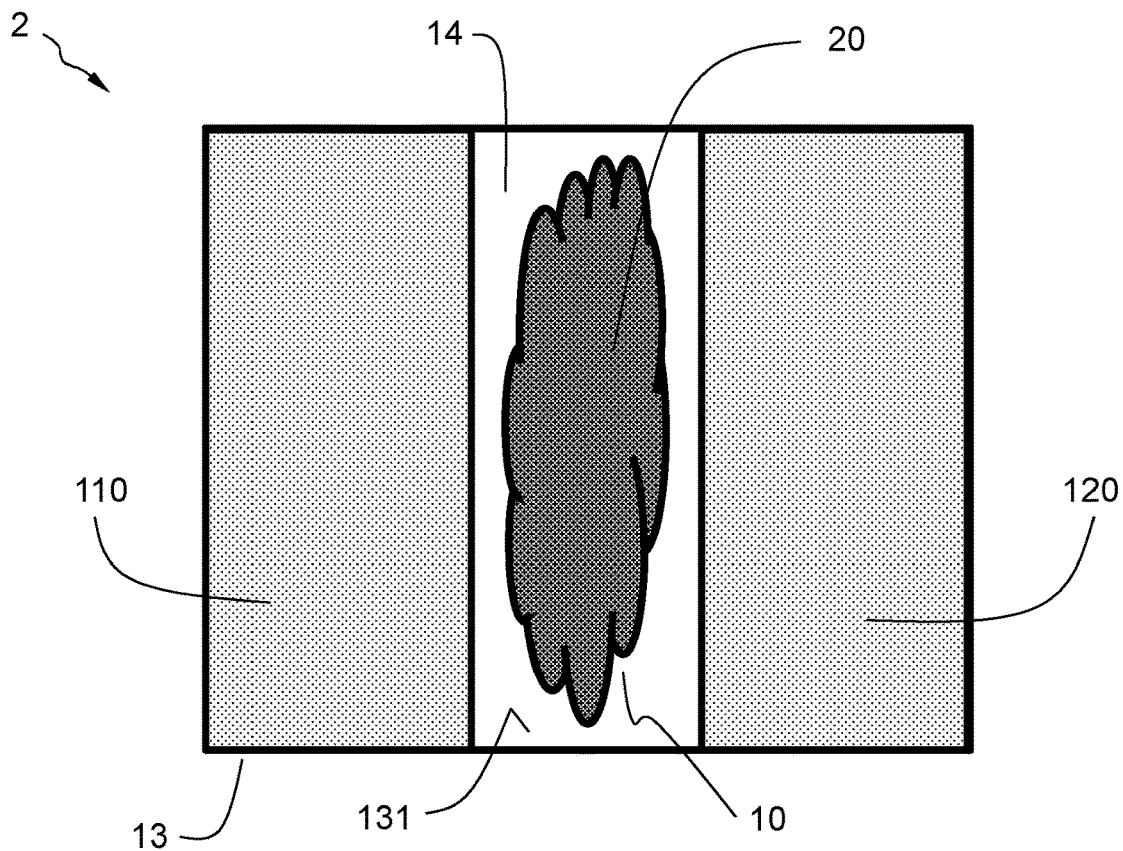
FIG. 6 is a simplified top view of a detector device corresponding to the sensing arrangement of FIG. 5.

The sensing arrangement 1 further comprises a trench 14, formed between the first LED 110 and the second LED 120. In this the example, both LEDs are formed on the substrate 13 and afterwards the trench 14 is formed by etching the p-type layer 112, 122 and the MQW structure 113, 123, so that the first LED 110 is arranged parallel to the second LED 120. In the sensing arrangement 1 shown in FIG. 5, the sensing area 10 is provided in the trench 14. A simplified top view of a detector device 2 corresponding to the sensing arrangement of FIG. 5 is shown in FIG. 6. For the sake of clarity and, in particular, in order to focus on the geometry of the most relevant elements of the embodiment, FIG. 6 does not show the terminals 114, 124, 115. The detector device 2 of FIG. 6 comprises a sensing arrangement 1 and a sensing substance 20 arranged in the sensing area 10 of the sensing arrangement 1. The sensing substance 20 is selected for experimenting an optical response as a response of an external stimulus.

In this exemplary embodiment, the external stimulus is the presence of an acidic substance in the environment, and the sensing substance 20 is a pH indicator having an optical response, in particular, a change of color. Indeed, in this first exemplary embodiment, the sensing substance 20 is bromophenol blue, which is a known pH indicator that changes from yellow at pH 3.0 to blue at pH 4.6. Other exemplary pH indicators are Phenol red, m-Cresol purple, Thymol blue, α-naphtholphthalein, etc.

Other embodiments of the sensing arrangement 1 and the detector device 2 according to the invention are disclosed hereinafter. These embodiments share most of the features disclosed in the first embodiment above. Therefore, only the differentiating features will be described in detail. For the sake of brevity, common features shared with the first embodiments disclosed above will not be described again herein below.

In one exemplary embodiment of the sensing arrangement 1 of the invention, the substrate 13 is reflective viewing from the first substrate surface 131.

In another embodiment, the substrate 13 is transparent and the sensing arrangement 1 further comprises a reflective coating provided covering at least part of the substrate 13, wherein reflection is produced towards the substrate 13.

In another exemplary embodiment, the sensing arrangement 1 further comprises a reflective coating arranged covering at least the part of the external surface of the first LED 110 that is not facing the sensing area 10, wherein reflection is produced towards the first LED 110.

In some embodiments, the external stimulus is at least one of:
   A presence of a chemical substance.
   A physical change, in particular of temperature, electromagnetic field, electro-magnetic radiation.
   A presence of a biological entity, in particular cells, microorganisms or other biological material.

Some embodiments rely on external stimuli that are combinations of the aforementioned examples.

In some embodiments the optical response is at least one of:
   a color change;
   a transparency change;
   a change in absorbance in at least one electromagnetic spectral band;
   a fluorescent response;
or combinations thereof.

Figure 7:
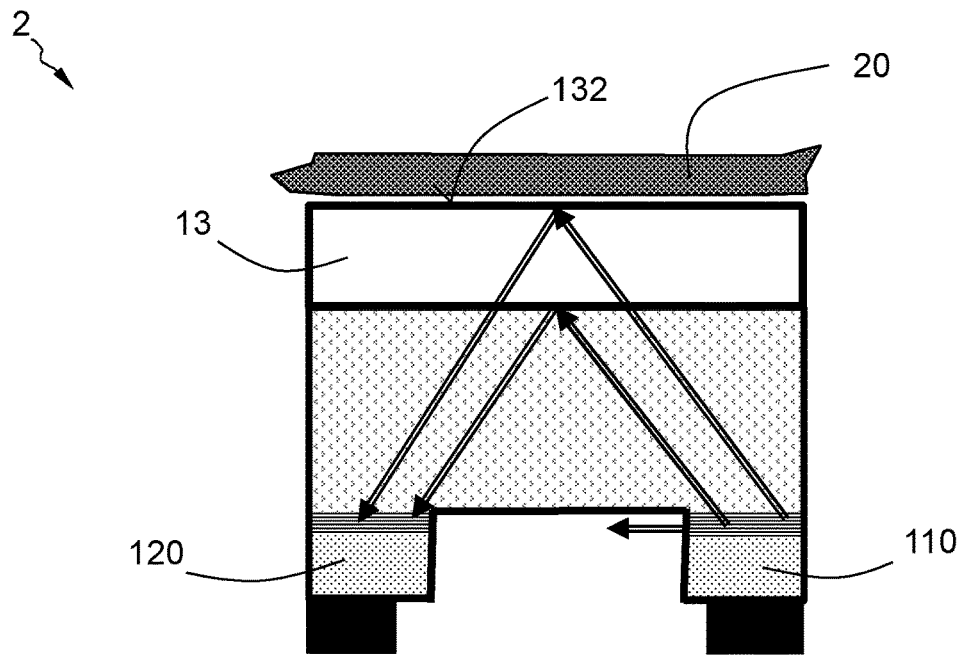
FIG. 7 is a simplified sectional view of a detector device according to one exemplary embodiment wherein the sensing area is located opposite to the LEDs.

In the exemplary embodiment shown in FIG. 7, the substrate 13 is transparent and the sensing area 10 is provided on the second substrate surface 132. Exemplary light reflections are shown by arrows in the figure.

Figure 8:
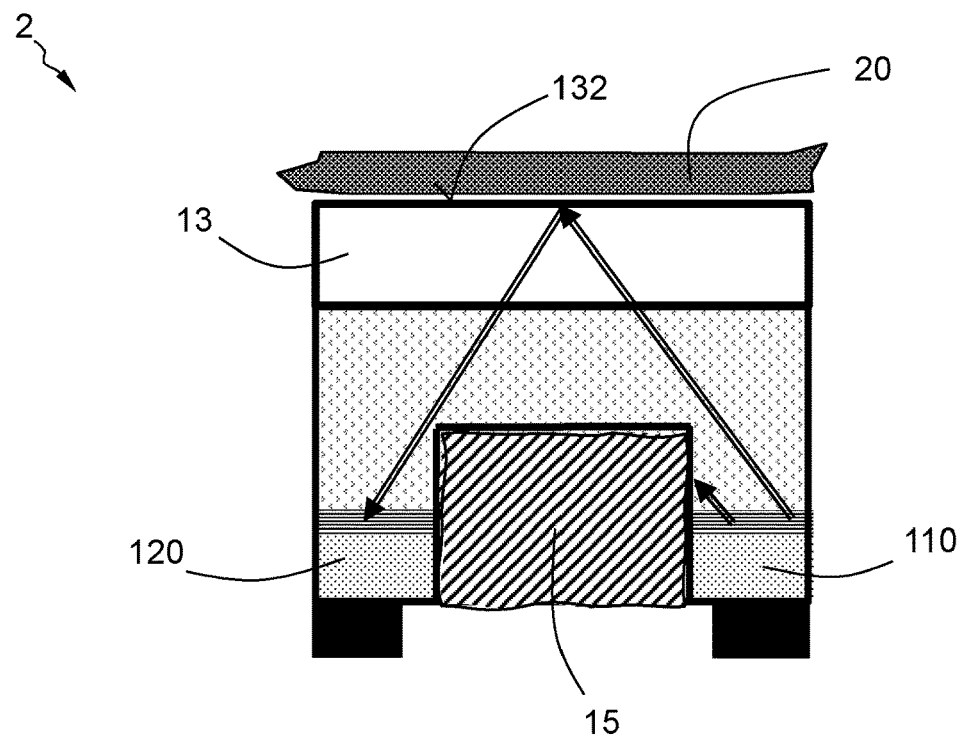
FIG. 8 is a simplified sectional view of a detector device according to one exemplary embodiment wherein the sensing area is located opposite to the LEDs and a light blocking layer is provided inside the trench.

A similar embodiment shown in FIG. 8, further comprises a light blocking layer 15 arranged in the trench 14. The light blocking layer 15 is configured to block a direct light from the first LED 110 to the second LED 120.

In other embodiments not shown in the figures, the sensing area 10 is provided on the second substrate surface 132 and the sensing arrangement 1 further comprises a microfluidic channel 16 arranged in the sensing area 10, which is configured to contain the sensing substance 20.

In still other embodiments not shown in the figures, the sensing area 10 is provided on the second substrate surface 132, the second surface 132 being submerged in the sensing substance 20 which is a liquid.

In the different exemplary embodiments shown in FIG. 9 to FIG. 12, the sensing area 10 is provided in the trench 14 and the sensing substance 20 is further arranged over at least part of the surface of at least one of the first LED 110 and the second LED 120. For the sake of clarity, in these figures the substrate 13 has been represented extending beyond the perimeter of the LEDs 110, 120, the skilled person will understand that this fact is only a matter of clarification and that the substrate 13 does not need to extend beyond the perimeter.

Figure 9:
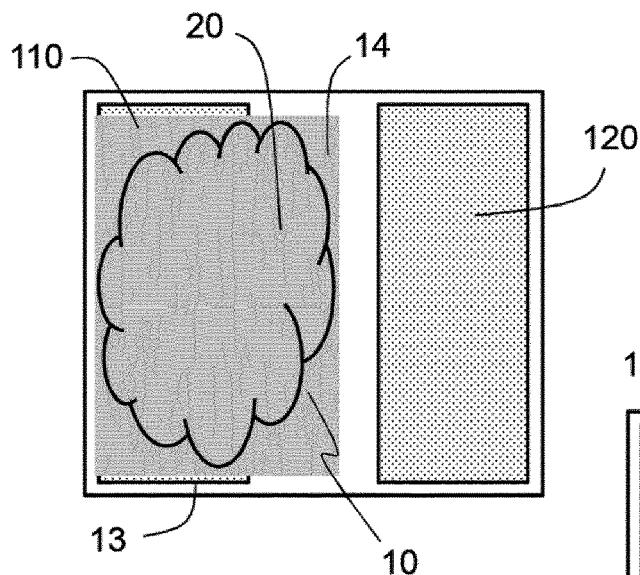
FIGS. 9 to 12 are simplified top views of different embodiments of detector devices according to the invention.
Figure 10:
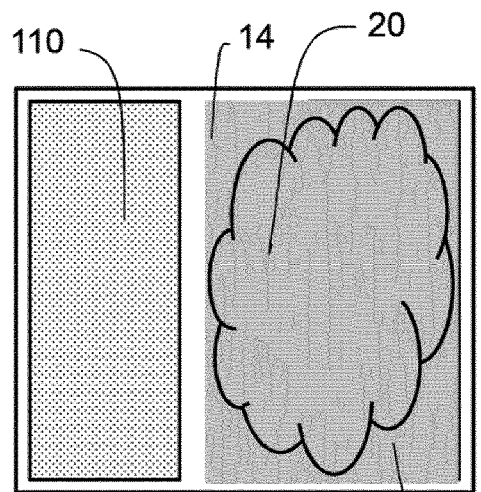
Figure 11:
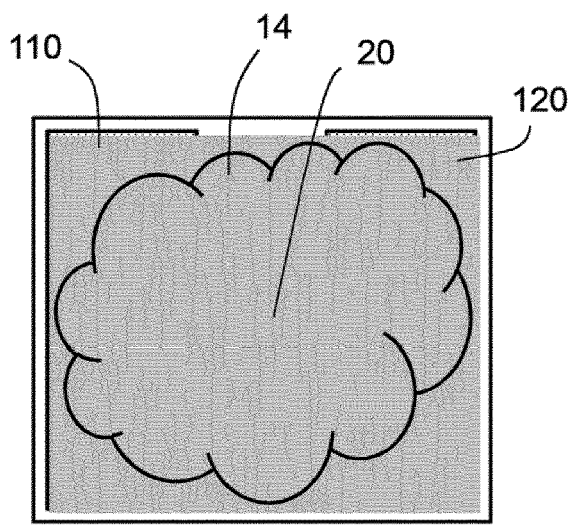
Figure 12:
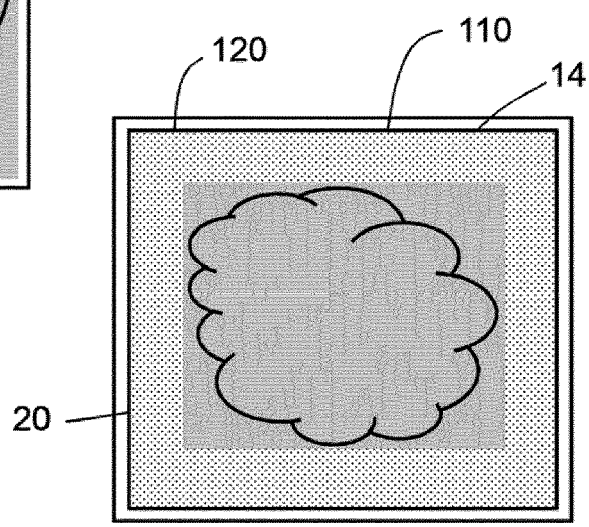

The first LED 110 is arranged parallel to the second LED 120 in FIG. 9, FIG. 10 and FIG. 11, while FIG. 12 shows an embodiment where the second LED 120 is arranged concentric with the first LED 110.

In the embodiment of FIG. 9, the sensing substance 20 is arranged over part of the first LED 110. In the embodiment of FIG. 10, the sensing substance 20 is arranged over part of the second LED 120. In the embodiment of FIG. 11, the sensing substance 20 is arranged over part of the first LED 110 and part of the second LED 120. In the embodiment of FIG. 12, the sensing substance 20 is arranged covering all the first LED 110, and a small part of the second LED 120. In another embodiment not shown in the figures, the geometry is the same than in FIG. 12, but the second LED 120 is at the centre and the first LED 110 is arranged concentric with that second LED 120.

In the different embodiments shown in FIG. 13 to FIG. 16, the sensing area 10 is provided in the trench 14.

Figure 13:
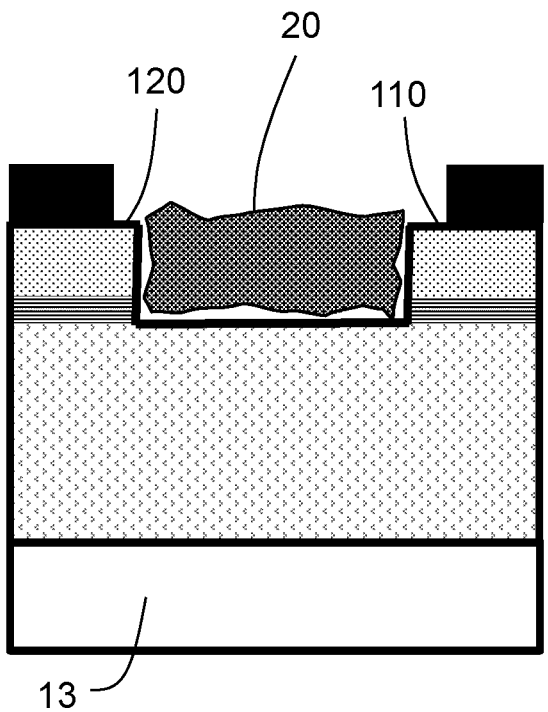
FIGS. 13 to 16 are sectional views of different embodiments of detector devices according to the invention.
Figure 14:
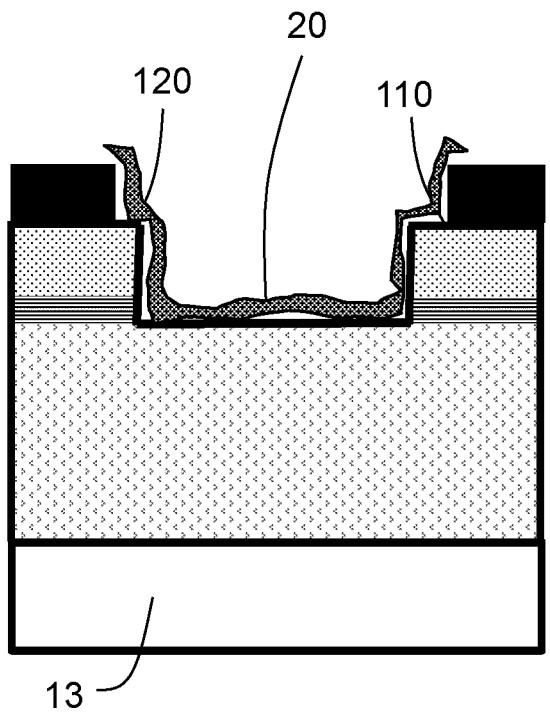
Figure 15:
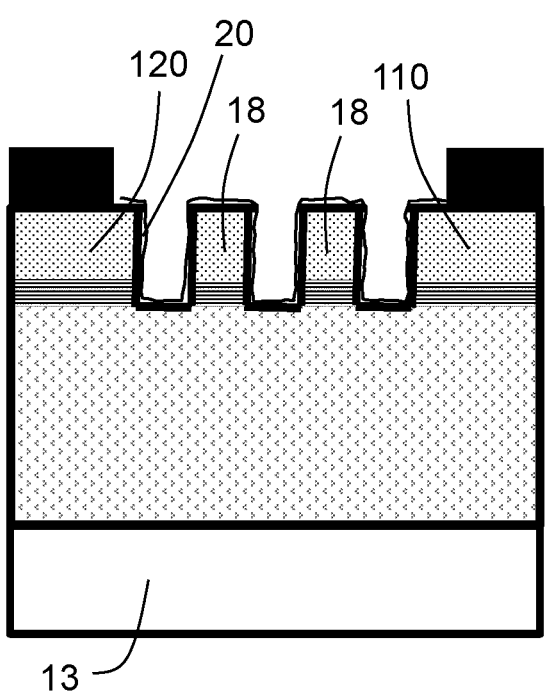

In the embodiment shown in FIG. 13, the sensing substance 20 is arranged filling the trench 14. In the embodiment shown in FIG. 14, the sensing substance 20 is arranged as a film layer.

Some embodiments have the sensing area 10 provided with a textured surface. This is the case of the embodiment shown in FIG. 15 where the texture in the textured surface has the form of ridges 18.

In another embodiment not shown in the figures, the sensing area 10 has a textured surface but it is located on the second surface 132 of the substrate 13.

Figure 16:
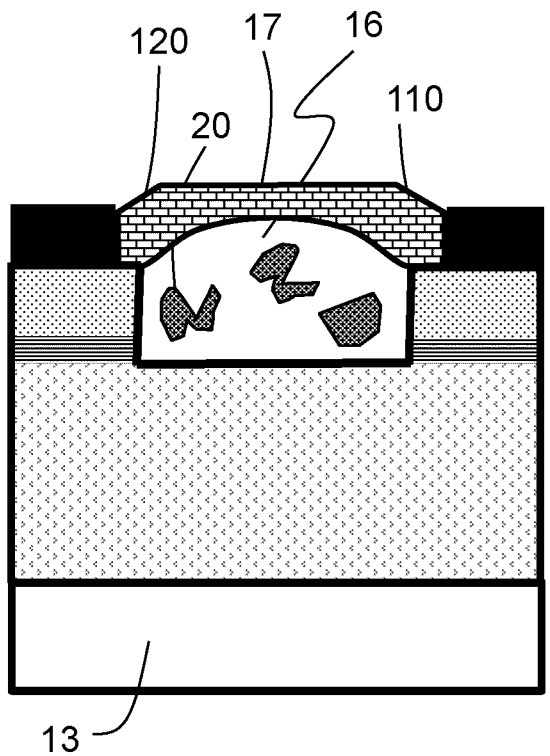

Another embodiment shown in FIG. 16 further comprises a microfluidic channel 16 arranged in the sensing area 10 and configured to contain the sensing substance 20. In the case of the example, the microfluidic channel 16 is formed by a cap 17 arranged covering the trench 14.

In some embodiments of the sensing arrangement 1 not shown in the figures, the light receiver 12 further comprises at least one further LED, formed on the first substrate surface 131 and configured for receiving a further light from the sensing area 10.

In addition, the aforementioned embodiments of detector devices 2 are used in embodiments of a multi-detector device comprising a plurality of detector devices 2, wherein the substrate 13 is common for all the detector devices 2.

In another further embodiment, both first LED 110 and second LED 120 are dual emitters and receivers, so that the second LED 120 is further configured for emitting light towards the sensing area 10 and the first LED 110 is further configured for receiving light from the sensing area 10. Other embodiments including at least one further LED also use this dual feature in said at least one further LED.

The invention claimed is:

1. A sensing arrangement, comprising:
   a sensing area, configured for accommodating a sensing substance selected for experimenting an optical response as a response of an external stimulus;
   a light emitter, configured for emitting a first light towards the sensing area; and
   a light receiver, configured for receiving a second light from the sensing area;
   a substrate having a first substrate surface and a second substrate surface, opposite the first substrate surface;
   wherein,
      the light emitter comprises a first LED, formed on the first substrate surface;
      the light receiver comprises a second LED, formed on the first substrate surface; and
      the sensing arrangement further comprises a trench, formed between the first LED and the second LED, wherein said first LED and said second LED, are formed from one single semiconductor stack.

2. The sensing arrangement according to claim 1, further comprising a sensing substance arranged in the sensing area, wherein the sensing substance is of the kind that experiments an optical response as a response of an external stimulus.

3. The sensing arrangement according to claim 2, wherein the optical response is at least one of:
   a color change;
   a transparency change;
   a change in absorbance in at least one electromagnetic spectral band;
   a fluorescent response;
or combinations thereof.

4. The sensing arrangement according to claim 2, wherein the external stimulus is at least one of:
   a presence of a chemical substance,
   a physical change, in particular of temperature, electromagnetic field, electro-magnetic radiation;
   a presence of a biological entity, in particular cells, microorganisms or other biological material;
or combinations thereof.

5. The sensing arrangement according to claim 1, wherein the substrate is transparent, and the sensing area is provided on the second substrate surface.

6. The sensing arrangement according to claim 5, wherein the trench contains a light blocking layer, configured to block a direct light from the first LED to the second LED.

7. The sensing arrangement according to claim 5, further comprising a microfluidic channel arranged in the sensing area and configured to contain the sensing substance.

8. The sensing arrangement according to claim 1, wherein the sensing area is provided in the trench.

9. The sensing arrangement according to claim 8, further comprising a microfluidic channel arranged in the sensing area and configured to contain the sensing substance.

10. The sensing arrangement according to claim 9, wherein the microfluidic channel is formed by a cap arranged covering the trench.

11. The sensing arrangement according to claim 8, wherein the substrate is reflective viewing from the first substrate surface.

12. The sensing arrangement according to claim 8, wherein the substrate is transparent, and the sensing arrangement further comprises a reflective coating provided covering at least part of the substrate, wherein reflection is produced towards the substrate.

13. The sensing arrangement according to claim 1, further comprising a reflective coating arranged covering at least the part of the external surface of the first LED that is not facing the sensing area, wherein reflection is produced towards the first LED.

14. The sensing arrangement according to claim 1, wherein the sensing area is provided with a textured surface, preferably in the form of ridges.

15. The sensing arrangement of claim 14, wherein the textured surface is in the form of ridges.

16. The sensing arrangement according to claim 1, wherein the light receiver further comprises at least one further LED, formed on the first substrate surface and configured for receiving a further light from the sensing area.

17. The sensing arrangement according to claim 1, wherein said first LED and said second LED are dual emitters and receivers, so that the second LED is further configured for emitting light towards said sensing area and said first LED is further configured for receiving light from said sensing area.

18. A detector device comprising a sensing arrangement as defined in claim 1.

19. The detector device of claim 18, further comprising at least one additional sensing arrangement, wherein the substrate of the sensing arrangement and the substrate of each of said at least one additional sensing arrangement is a common substrate.

* * * * *